US006519830B1

(12) United States Patent
Mehan

(10) Patent No.: US 6,519,830 B1
(45) Date of Patent: Feb. 18, 2003

(54) METHOD AND APPARATUS FOR INSERTING A PLATE NUT INTO A BLIND CAVITY

(76) Inventor: Darrel P. Mehan, 5638 Wild Olive St., Las Vegas, NV (US) 89118

( * ) Notice: Subject to any disclaimer, the term of this patent is extended or adjusted under 35 U.S.C. 154(b) by 104 days.

(21) Appl. No.: 09/724,166

(22) Filed: Nov. 28, 2000

(51) Int. Cl.$^7$ .................................................. B23P 11/00

(52) U.S. Cl. ................................ 29/525.01; 29/525.11; 81/488; 403/408.1

(58) Field of Search ......................... 29/525.01, 525.02, 29/525.11, 271, 558; 403/408.1, 368, 370, 374.3; 81/488, 484, 459

(56) References Cited

U.S. PATENT DOCUMENTS

| | | | | |
|---|---|---|---|---|
| 1,382,320 A | | 6/1921 | Riley et al. | |
| 1,521,026 A | | 12/1924 | Hubener | |
| 2,040,374 A | * | 5/1936 | Grimes | 403/408.1 |
| 2,572,588 A | | 10/1951 | Bedford, Jr. | |
| 2,594,321 A | | 4/1952 | Leftwich | |
| 2,664,771 A | | 1/1954 | Elliott | |
| 2,768,543 A | | 10/1956 | Pugh, Jr. | |
| 2,853,113 A | | 9/1958 | Flora et al. | |
| 2,931,257 A | | 4/1960 | Horrocks | |
| 3,049,369 A | | 8/1962 | Trafton | |
| 3,057,053 A | * | 10/1962 | Schlage et al. | 29/558 |
| 3,232,148 A | | 2/1966 | Dearing | |
| 3,305,995 A | * | 2/1967 | Armstrong et al. | 403/408.1 |
| 3,507,172 A | | 4/1970 | Smith | |
| 3,986,318 A | * | 10/1976 | McConnell | 403/408.1 |
| 4,021,991 A | * | 5/1977 | Hotz | 403/408.1 |
| 5,174,675 A | * | 12/1992 | Martin | 403/408.1 |
| 5,473,807 A | * | 12/1995 | Tupa et al. | 29/525.01 |
| 5,727,431 A | | 3/1998 | Wivagg | |

* cited by examiner

*Primary Examiner*—David P. Bryant
*Assistant Examiner*—Jermie E. Cozart
(74) *Attorney, Agent, or Firm*—Quirk & Tratos

(57) ABSTRACT

A method and apparatus for inserting a plate nut into the interior of a closed cavity through one enlarged opening includes an annular insert that is used to fill the enlarged opening once the plate nut is inserted. Once in place the plate nut may be held in position through the other openings while the insert is fitted and compressed by threaded engagement. The plate nut body may be shaped in various forms to fit various structural spaces in each instance insertable through the opening that is later covered by the insert. A hinged tool threadably engaged to the plate nut may be utilized in the course of the installation and thereafter removed.

5 Claims, 2 Drawing Sheets

METHOD AND APPARATUS FOR INSERTING A PLATE NUT INTO A BLIND CAVITY

BACKGROUND OF THE INVENTION

1. Field of the Invention

The present invention relates to a method and apparatus for inserting a plate nut into a blind cavity, and more particularly to a process for inserting a plate nut through one of its fastening holes.

2. Description of the Prior Art

In the course of any mechanical assembly occasions arise in which a fastener is threaded into a nut that is inaccessible. As a result various plate nuts or holding devices have been devised which in one manner or another are retained in the inaccessible cavity holding the nut in a position while it is threaded by the fastener. In the instances where the necessity for blind fastening is anticipated the foregoing techniques have been adequate and no further improvement was therefore required.

Occasionally, however, unanticipated events require access to a blind cavity in order to position a nut therein for fastening. In the past various tools have been devised which, in one manner or another, are useful in manipulating a nut into a cavity that is difficult to reach. Examples of such prior solutions may be found in U.S. Pat. No. 2,664,771 to Elliott, U.S. Pat. No. 3,507,172 to Smith, U.S. Pat. No. 2,594,321 to Leftwich and U.S. Pat. No. 5,727,431 to Wivagg. While suitable for the purposes intended each of the foregoing devices requires some form of access to the position at which the nut is to be placed.

In those instances where rear access is completely limited few tooling solutions are available in the art. Accordingly a technique for aligning a nut inside a blind cavity is extensively sought and it is one such technique that is disclosed herein.

SUMMARY OF THE INVENTION

Accordingly it is the general purpose and object of the present invention to provide a technique for positioning threaded plate nuts in a blind cavity.

Other objects of the invention are to provide a method and a tool for installing a threaded fastener into a fully inaccessible structure.

Further objects of the invention are to provide a method for installing and affixing a plate nut from the fastener side of a structure.

Briefly, these and other objects are accomplished within the present invention by providing an elongate plate nut that includes the threaded opening to be engaged by the fastener and also a further opening by which the plate nut may be secured to the adjacent structure. In section, the plate nut may be rounded to a semicircular form for insertion through an enlarged drilling in the structure. This drilling may be chamfered for receipt of an insert after the plate nut is installed, which is then used to fasten the plate nut in place.

A hinged tool may be utilized in the course of insertion of the plate nut and once positioned through the enlarged drilling the other plate nut opening may then serve to hold the plate in place. The insert then placed into the enlarged drilling is captured by a plate holding fastener that is then threaded into the further opening therein.

In this manner a repair can be effected over a blind structural enclosure by forming a chamfered drilling in the structure dimensioned to the plate nut section, then inserting the plate nut therethrough and thereafter holding the plate nut in place through the opening that has been formed for the structural repair. Once so positioned the plate nut is then fixed in place an insert in the chamfered drilling which is then captured by a plate securing fastener.

DESCRIPTION OF THE PREFERRED EMBODIMENT

Figure 1:
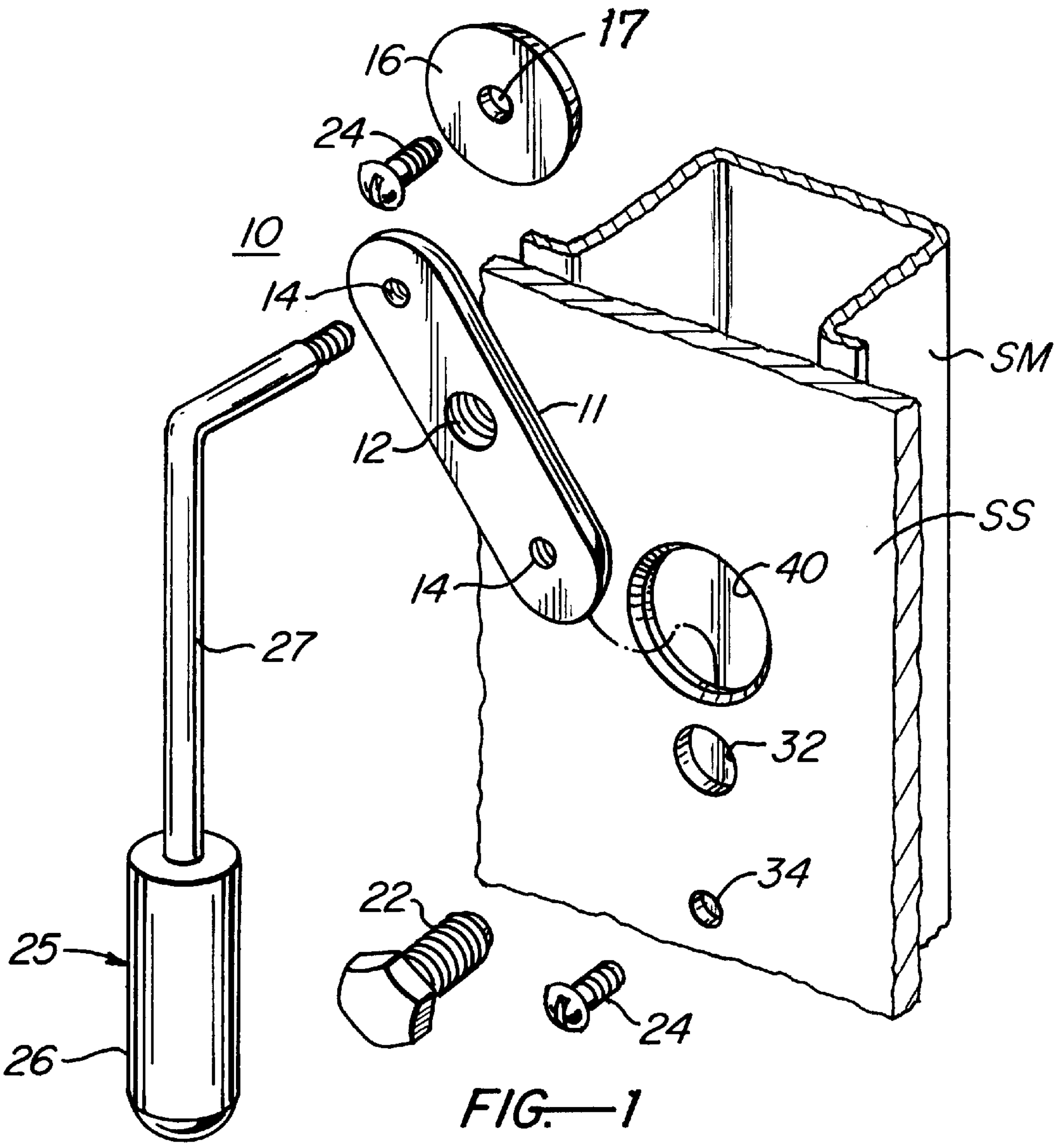
FIG. 1 is a perspective illustration, separated by parts of the inventive plate nut insertion process.
Figure 2:
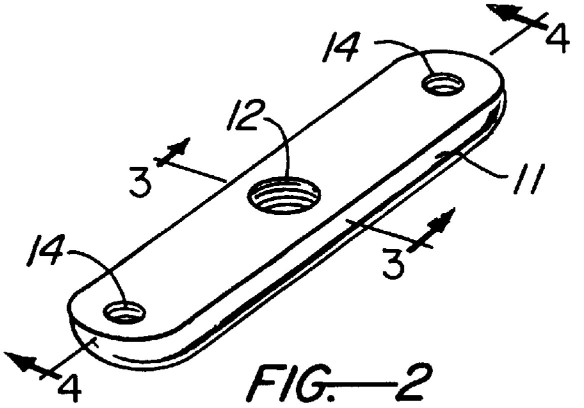
FIG. 2 is a perspective illustration of an inventive plate nut useful with the installation process disclosed.
Figure 3:
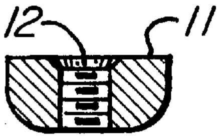
FIG. 3 is a sectional view taken along line 3—3 of FIG. 2.
Figure 4:
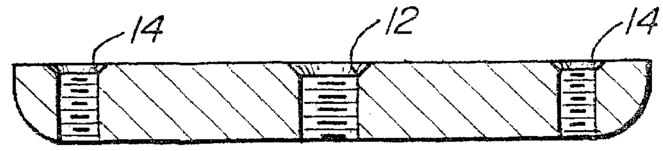
FIG. 4 is yet another sectional view taken along line 4—4 of FIG. 2.

As shown in FIGS. 1–5 the inventive plate nut assembly generally designated by the numeral 10 includes an elongate plate nut 11 provided with a load carrying threaded opening 12 adjacent one or more plate securing openings 14 each threaded on the interior for receiving a corresponding fastener 22 and 24. While shown as screws having rounded heads, the fasteners 22, 24 can just as easily have flat heads which become flush with a surface of SS upon installation. Preferably the plate nut 11 is insertable into the interior of a closed cavity formed by a structural stiffener or other structural member SM attached to a structural surface SS. To allow for such insertion a series of openings or drillings are made in the surface SS, shown as an opening 32 for receiving fastener 22. Plate nut 11, moreover, may be shaped as a semicircular section for convenient passage through a second circular chamfered opening 40 aligned adjacent opening 32 in surface SS. A final opening 34 in surface SS also aligned adjacent to opening 32 is used for passing the securing fastener 24. Openings 40, 32 and 34 communicate into the closed cavity formed between surface SS and structural member SM, with opening 40 being the size allowing the insertion of the plate nut 11 therethrough in the manner described below.

More precisely opening 40 is formed as a drilling of a diameter equal to the semicircular section diameter of the plate nut 11 with the center-to-center dimension relative opening 32 being equal to the separation between the threaded bores or openings 12 and 14. Once drilled, the edges of opening 40 may be chamfered to form a chamfered seat 41 conformed to the plan form of a similarly chamfered insert 16. Insert 16 then provides a fastener opening 17 in its center for a further one of the fasteners 24.

Figure 7:
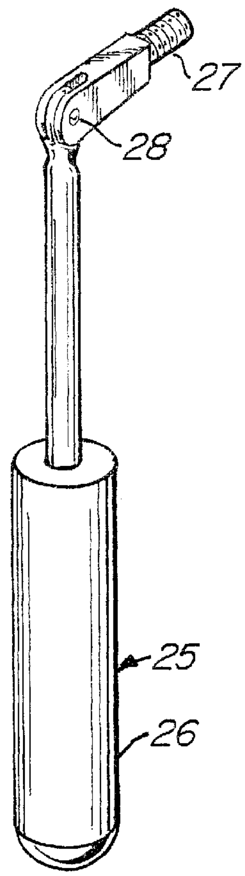
FIG. 7 is a perspective illustration of an inventive installation tool useful with the process disclosed.

As shown further in FIG. 7 an elongate tool 25 defined by a handle 26 and a threaded bent end piece 27 is then threadedly engaged into one of the fastener openings 14, providing manipulative convenience in the course of the plate nut insertion. To further enhance manipulation the end piece 27 may be deployed from a hinge 28 and once the plate nut 11 is thus passed into the closed cavity formed by the structural member SM one of the other fastener openings 12 or 14 may then be used to hold the plate nut in place. The tool 25 is then disengaged and the insert 16 placed into opening 40 and then captured in compression against the chamfered edge 41 by the threaded advancement of a further fastener 24.

In this manner threaded fittings can be inserted into blind cavities for use as structural connections for various attachments. These attachments can be added at any time and are particularly useful in effecting repairs.

Figure 6A:
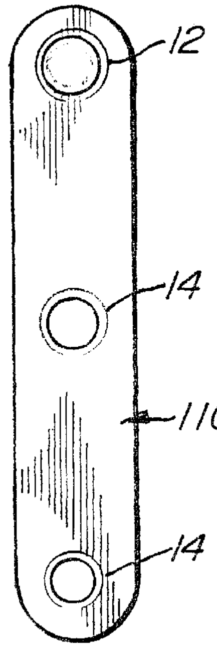
FIGS. 6*a* and 6*b* are each top view illustrations of other plate nut forms in accordance with the present invention.
Figure 5:
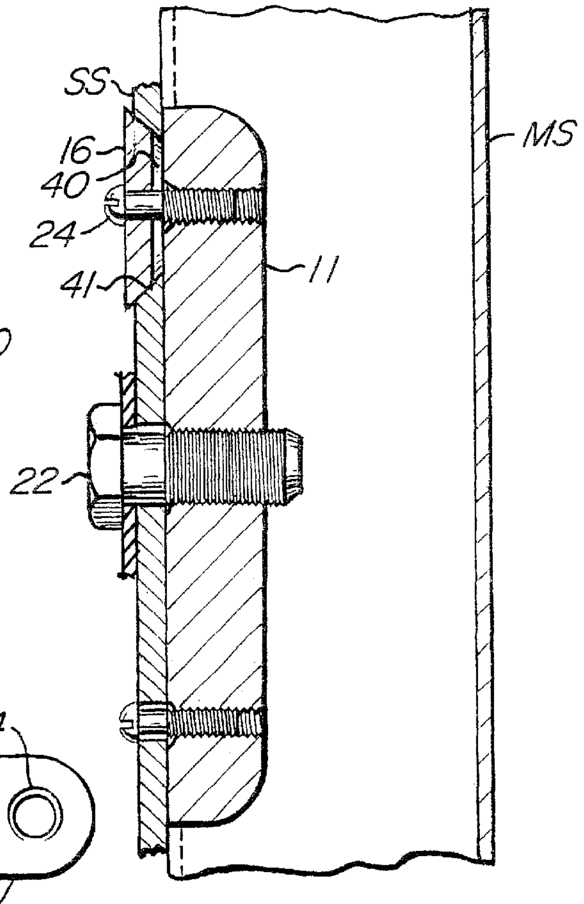
FIG. 5 is a further sectional view illustrating the inventive plate nut in its first engagement.
Figure 6B:
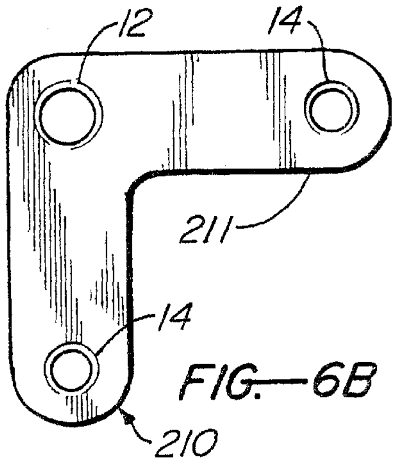

By reference to FIGS. 6*a* and 6*b* plate nut 11 may be variously formed. For example, as shown in detail in FIG. 6*a* an alternative configuration of the plate nut shown as plate nut 110, may include the main threaded opening 12 proximate one end with the securing openings 14 at the other. Alternatively, the plate nut may be arched or angled in plan form as illustrated in FIG. 6*b,* the leg 211 of the plate nut 210 forming a corner. In this form the plate nut is engageable in angulated cavities. Accordingly, various plate nut forms can be utilized in various installations and may form an assortment that is brought to each repair assignment.

Obviously many modifications and variations are possible without departing from the spirit of the invention disclosed. It is therefore intended that the scope of the invention be determined solely by the claims appended hereto.

I claim:

1. A method for installing a plate nut into a closed cavity comprising the steps of:

drilling a first opening into said closed cavity conformed to press a threaded fastener therethrough;

drilling a second opening into said closed cavity adjacent the first opening; chamfering the peripheral edge of said second opening;

inserting an elongate plate nut through said second opening into the interior of said closed cavity, said plate nut having a semicircular section diameter substantially equal to the diameter of said second opening;

aligning said plate nut in said closed cavity adjacent said first opening;

securing said plate nut through said first opening;

placing a chamfered insert into said second opening; and compressing said insert against edges of said second opening by threaded engagement to said plate nut.

2. A method according to claim 1, further comprising the steps of:

forming a first and second threaded bore in said plate nut;

inserting a first threaded fastener through said first opening into said first bore; and inserting a second threaded fastener through said insert into said second bore.

3. A method according to claim 1 wherein:

said step of inserting further includes a step of engaging a tool to said plate nut for manipulation thereof into said closed cavity.

4. A method according to claim 3, further comprising the steps of:

forming a first and second threaded bore in said plate nut;

inserting a first threaded fastener through said first opening into said first bore; and inserting a second threaded fastener through said insert into said second bore.

5. A-method according to claim 4 wherein:

said step of engaging a tool further includes the step of threadably inserting an end of said tool into said second bore.

* * * * *